July 10, 1934.   O. W. GREENE   1,966,170
AUTOMATIC STEERING DEVICE
Filed Nov. 15, 1929
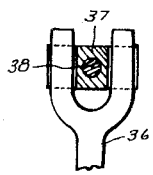
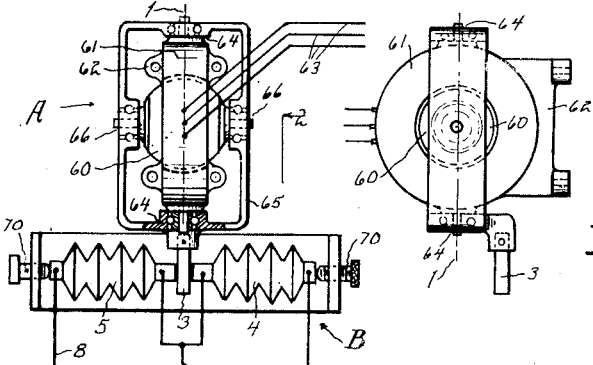
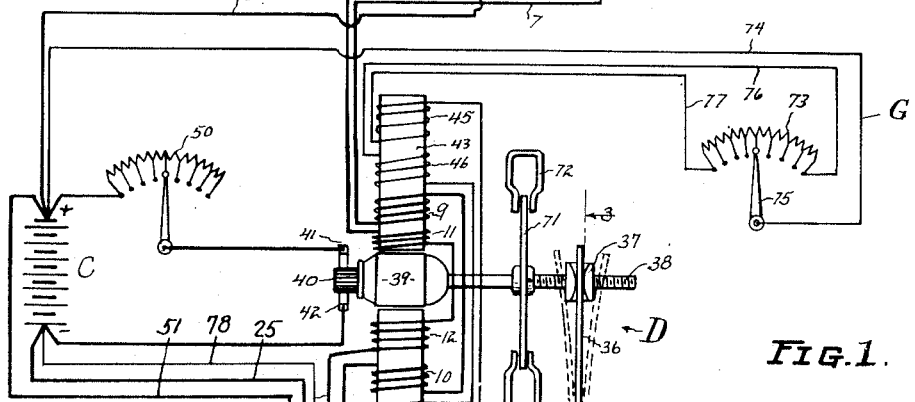
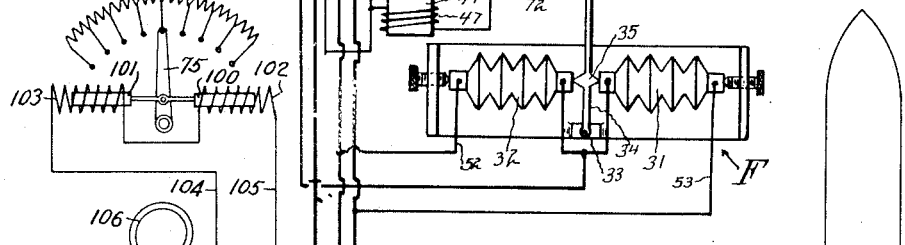
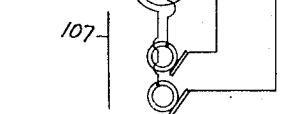
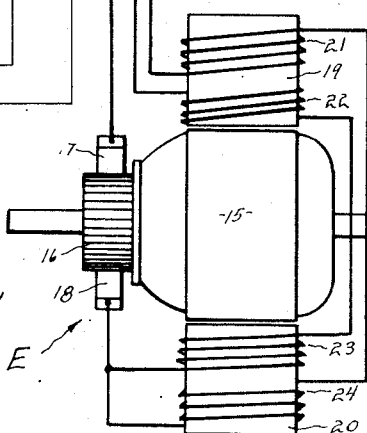
INVENTOR
Otto W. Greene
ATTORNEYS Patented July 10, 1934

1,966,170

UNITED STATES PATENT OFFICE 1,966,170

AUTOMATIC STEERING DEVICE

Otto W. Greene, Elyria, Ohio

Application November 15, 1929, Serial No. 407,445

13 Claims. (Cl. 172—282)

This invention relates to means and methods for effecting the automatic steering of water craft or air craft.

In the following, I have chosen to describe my invention in connection with water craft, but it is equally applicable to the steering of air craft.

Means and methods have heretofore been proposed for automatically steering water craft, particularly vessels on the high seas, but so far as I am aware, such steering mechanisms have been designed to be responsive to the degree of movement or divergence of the vessel from a true prescribed course, that is, the rudder of the vessel is moved to correct the forward direction of the vessel an amount in proportion to the amount of movement of the vessel from the true course. Thus, the farther the vessel yaws or diverges to one side of the true course, the farther will the rudder be turned in the effort to return it to the course; and as the vessel is returned by the rudder to the true course, the rudder is correspondingly returned to its normal or neutral position. As a consequence, although the vessel is in the summation or average of its movements held to the prescribed path or course, it does so by swinging back and forth across the path, or, "hunting" rather than by being held closely to the path.

This effect of swinging back and forth is magnified by the momentum of the vessel, which when it returns to the true course carries it beyond or to the other side of the course, and then on the second return to the true path, the vessel acquires momentum which carries it again beyond the true course. Thus, the vessel hunts back and forth across the path it is desired for it to follow.

This hunting effect is noticeable by the passengers and is a source of discomfort, if not in some cases of alarm to them.

This hunting movement is even more noticeable and undesirable when the vessel is proceeding through a quartering sea. Here the bow of the vessel may be forced to one side as it rises on the wave and the rudder, no matter how far it may be thrown in the corrective direction, cannot hold the vessel on its course. As soon as the wave has passed the center of the vessel it exerts an almost equal force tending to bring the vessel back to its original path, and the steering mechanism, if of the type responsive to the amount of divergence of the vessel from the path, will attempt to change from one extreme rudder position to the other to correct the rapid successive changes of the direction of the vessel due to the wave, and usually the vessel will be turned toward the original position by the passing wave while the rudder is still in the direction to so return it, and the vessel will be carried beyond its original direction with a magnified hunting movement.

When the craft being controlled by such steering mechanism is air craft of either the dirigible or airplane type, the changes of direction will be more rapid and complex and the tendency to hunt from side to side of the true path is more markedly undesirable than in ocean going vessels, since the hunting movements are quicker and more alarming to the passengers.

The principle underlying the steering mechanism of my invention operates not only to return the vessel to or approximately to its prescribed or true course if it diverges or is displaced therefrom, but also operates to tend to prevent the vessel from moving from its true course by causing the rudder to be correctively moved not only responsive to the amount of ultimate displacement from the course, but also responsive to the rate or violence of the tendency to move from the course in the first instance.

Upon the return of the vessel toward the course, it is prevented from swinging beyond it and the forward movement of the vessel is rendered positive and smooth along its course. The movements of the rudder correspond, with a relatively close approximation, to the movements it would have if the rudder were controlled by an experienced helmsman capable of responding instantly to the movements of the vessel and of anticipating the amount of swing by sensing the rate thereof.

In the particular embodiment of my invention, illustrated and described herein, one essential element, sensitive to the movements or tendency to move of the vessel, is a gyroscope of the precession type, but as will be understood, various organs of the controlling system may be brought into operation through the agency of other devices, such as a gyroscopic compass or earth's magnetic field generator, etc.

It is, therefore, one of the objects of my invention to provide an automatic steering mechanism by which a vessel may be held more closely to a true prescribed course than has heretofore been possible.

Another object of my invention is to provide an automatic steering mechanism responsive to the rate of movement of a vessel from the prescribed true course and also responsive to the resultant amount of such movement or displacement from the course.

Another object is to provide an automatic steering mechanism which, upon correctively returning the vessel to its course, checks or prevents the momentum of the vessel from carrying it beyond the course.

Another object is to provide an automatic steering mechanism operating on the general principle of holding the vessel on its course rather than returning it to its true course after divergence therefrom.

Another object is to provide an automatic steering mechanism adaptable to be simply and easily adjusted to compensate for lateral drift of the vessel.

Another object is to provide an automatic steering mechanism adaptable by simple and easy adjustment to various sizes of vessel and to various general conditions of operation of the vessel.

Another object is to provide an automatic system for operating the rudder of a vessel to hold the vessel generally on a straight line course, but which may be operatively modified manually to cause the direction of the vessel to follow accurately a prescribed curve; and which may be modified manually or by any suitable compass device, such as a magnetic compass, gyroscopic compass, earth magnetic field generator or the like, to compensate for lateral drift of the vessel; or for gradual divergence from the course due to accumulation of functional inaccuracies in the apparatus.

Other objects are to effect the steering control of the vessel in the manner hereinafter described and through the agency and coordination of the means employed to this end and as set forth hereinafter.

Other objects will be apparent to those skilled in the art to which this invention pertains.

My invention is fully disclosed in the following description taken in connection with the accompanying drawing, in which:—

Fig. 1 is a diagrammatic view illustrating the various elements of my improved automatic steering mechanism and a system of electrical interconnections therefor;

Fig. 2 is an elevational view of one of the elements of Fig. 1 taken approximately from the plane 2 of Fig. 1;

Fig. 3 is a view of a part of another element of the system taken approximately from the plane 3 of Fig. 1;

Fig. 4 is a diagrammatic view illustrating the mechanical connections from the rudder of a ship to the rudder operating mechanism, diagrammatically illustrated in Fig. 1;

Fig. 5 is a fragmentary view similar to a part of Fig. 1 and illustrating a modification;

Fig. 6 is a fragmentary view similar to a part of Fig. 1 and illustrating another embodiment.

The preferred means for carrying out my invention according to the preferred method will now be described.

Referring to the drawing, in Fig. 1, I have shown at A, generally, a precession gyroscope, the sensitive axis 1 of which is disposed on the vessel to be steered in a horizontal plane and parallel to the longitudinal axis of the vessel.

The gyroscope illustrated in the drawing is of the self-driving type. The rotary element 60 is in the form of the rotor of an induction motor mounted for rotation within a wound motor stator 61 stationarily supported upon a base 62. The stator 61 may be energized from a three phase source of alternating current through wires 63. The stator is provided with gimble bearings 64—64 upon which is mounted for oscillation thereon a frame 65. The frame has bearings 66—66 supporting the shaft of the rotor 60.

The bearings 64—64 and 66—66 are preferably antifriction bearings, such as ball bearings. The construction is such that the sensitive axis 1 referred to co-axial with the bearings 64—64 is intersected at the center of the rotor 60 by its own axis of rotation. In order that the rotor 60 may rotate within the stator 61 and also oscillate on the axis 1, the peripheral surface of the rotor 60 is made generally spherical to maintain a substantially constant clearance between the rotor and the stator at all positions of the rotor for purposes well known to those skilled in the design of induction motors; and in correspondence therewith the pole faces of the stator 61 may be made concavely spherical or cylindrical.

Upon any movement of the vessel causing the axis 1 to swing clockwise or counter-clockwise as viewed in Fig. 1, the frame 65 of the gyroscope will tend to rotate around the axis 1. A pin 3 mounted on the frame 65 below the axis 1 will thus tend to rotate around the axis. The pin 3 is disposed between the two carbon piles 4 and 5 respectively of a compression rheostat shown generally at B, the innermost adjacent elements of the piles 4 and 5 being in pressure engagement with the pin 3 on opposite sides thereof. Thus, the tendency of the pin 3 to rotate or move results only in exerting pressure to operate the rheostat B, the actual movement of the pin 3 being limited to the maximum compressive movement of the carbon piles and this movement is preferably made very small. Thus, the gyroscope A exerts pressure on the rheostat B to increase the pressure on one pile and decrease the pressure on the other in accordance with the direction of movement of the vessel from its prescribed course; and the amount of the pressure is proportional to the rate of swinging movement of the axis 1; and upon cessation of the movement of the axis by cessation of swinging movement of the vessel, whatever direction the vessel may be taking at the time, the pressure exerted by the pin 3 on the rheostat ceases and the pressures on the piles 4 and 5 become equal.

Current is supplied to the rheostat B from a suitable source of direct current such as a battery C, the current flowing by way of wire 6 to the two piles 4 and 5 and through the piles and out by way of wires 7 and 8. When the pressure on the piles 4 and 5 is equal, the current flowing through them will be equal and the amount of this current and the equalization thereof may be adjusted by pressure adjusting screws 70—70.

Current through the pile 4 flows by way of wire 7 through field windings 9 and 10 of an integrating motor shown generally at D and current through the pile 5 flows by wire 8 through opposing field windings 11 and 12 of the integrating motor and thence respectively by wires 13 and 14 to a direct current torque motor E. The integrating motor D will later be described.

The motor E has an armature 15 of the wound type energized through a commutator 16 and brushes 17 and 18. The field of the motor is in the diagrammatic representation in the drawing of the bi-polar type having field poles 19 and 20, each energized by two opposing field windings 21, 22 and 23, 24. The windings 21 and 24 are in series with each other energized by current in the wire 13 and the opposing windings 22 and 23 are likewise in series with each other energized by current in the wire 14; and the circuits through the fields just described join at the brush 18 and are completed through the commutator 16, brush 17 and by wire 25 to the battery C. Upon the shaft 26 of the motor E is a cable drum 27 upon which is wound a cable 28, the ends 29 and 30 of which are carried to the rudder operating mechanism of the vessel, Fig. 4, and any turning of the armature 15 in either direction will thus move the rudder 80 correspondingly.

The motor E thus does not continuously rotate in either direction, but rotates only sufficiently to move the rudder and in any position of the rudder except its neutral position exerts torque thereon whether the armature is rotating or at rest. As is well known, when the vessel is progressing forwardly, the water pressure on the rudder tends at all times to return it to a neutral or straight ahead position.

Therefore, the pressure of the rudder opposes the torque of the motor in the operation of the system, as will be further described. If the energization of the motor develops less than enough torque to hold the rudder in a steering position, the pressure of the rudder will react through the cable 28 and overhaul the motor armature and move it toward or to its neutral position.

The operation of the system thus far described is as follows. When the vessel is proceeding straight ahead on its prescribed course, the gyroscope A is inert and pressures on the piles 4 and 5 of the rheostat B are equal, and therefore current in the battery C flows in equal amount through each carbon pile and by way of wires 7 and 8 and 13 and 14 energizes the fields and armature of the motor E.

Because the field windings on each pole oppose each other, the field strength is zero and although the current flows through the armature 15, no torque is exerted by the motor E and the ship rudder maintains its neutral straight ahead position. If, due to any cause, the prow of the vessel should be moved from the true course, the gyroscope A will correspondingly increase the pressure on one of the piles 4 or 5 and decrease it on the other, causing more current to flow through one than the other and thus causing the ampere turns of the windings of the motor E to be unbalanced, producing a field for the motor E and creating torque therein. The armature 15 of the motor E will therefore turn and move the rudder in the direction tending to check the angular movement of the craft. The amount of pressure against the rudder will be in proportion to the rate at which the vessel swings from its course due to the type of gyroscope employed, so that when the rudder has stopped the vessel from further leaving its course, the torque of the motor E on the rudder ceases and the rudder returns to its neutral position.

The result, therefore, of that much of the system thus far described will be to quickly overcome the movement of the vessel from its course, but will tend to leave it proceeding in a new direction somewhat off of that course.

By means of an integrating motor D and compression rheostat F, which will now be described, the vessel is returned to its original true course and since the integrating motor D functions concurrently with the elements above described, the joint action thereof is to keep the vessel continuously on its true course with the minimum of divergence therefrom at any time.

The rheostat F is similar to the rheostat B, above described, and comprises a pair of compression piles 31 and 32. To vary the pressure on the piles, a lever 34 is pivoted at 33 to the frame of the rheostat and has a double fulcrum 35 for alternately compressing the piles 31 and 32 when the lever is moved from side to side as viewed in the drawing. The upper portion 36 of the lever is resilient and terminates upwardly in a bifurcation to embrace a travelling nut 37 on a screw threaded portion 38 of the integrating motor shaft, by which construction when the shaft 38 of the motor rotates in alternate directions, the nut 37 will travel inwardly or outwardly and correspondingly exert pressure respectively on the rheostat pile 31 or 32.

The integrating motor D is of the direct current type having a wound armature 39, commutator 40 and brushes 41 and 42. The field of the motor in the diagrammatic illustration is bi-polar and each of the poles is provided with four windings. The windings 9 and 11 and the windings 10 and 12 thereon have been referred to and are wound to oppose each other on the poles 43 and 44 respectively. Other pairs of windings on the poles 43 and 44, namely the windings 45 and 46 and the windings 47 and 48 also oppose each other and will be later referred to.

The armature 39 is energized directly from the battery C through an adjustable rheostat 50. On the armature shaft, to absorb momentum of the armature 39 and prevent spinning or overtravelling thereof for purposes to be described, is a damping or braking disk 71 mounted to rotate between the poles of a pair of permanent magnets 72—72 in a well known manner.

It will now be apparent that rotation of the armature 39 of the integrating motor in one direction will, so long as it rotates continuously, increase the pressure on one or the other of the piles of the rheostat F through the agency of the travelling nut 37 and that this unbalanced condition of the rheostat F will obtain until the armature 39 has rotated an equal amount in the reverse direction.

To effect the rotation of the armature 39, its own winding is continuously energized through a local circuit comprising the brushes 41 and 42 and rheostat 50. The field, however, may vary from zero to maximum in response to the variation of current in its opposing windings and inasmuch as its windings are in series respectively with the field windings of the motor E, the field of the motor D will vary correspondingly with the field of the motor E.

The connections to the rheostat F are similar to those for the rheostat B, the positive side of the battery C being connected by a wire 51 to a common connection of the piles 31 and 32, and the opposite end of the pile 31 being connected by wire 52 to the wire 14 and the opposite end of the pile 32 being connected by wire 53 to the wire 13. Thus, current from the battery may flow by wire 51 through the piles 31 and 32, and thence through the field windings of the motor E similarly to the flow of current from the battery C by way of wire 6 through the piles 4 and 5, through the rheostat B, and through the same windings of the motor E.

The operation of the integrating motor D concurrently with the torque motor E as above described will now be set forth. As above described, the swinging of the vessel from its true course or true straight ahead direction creates an unbalanced pressure on the piles of the rheostat B, which pressure continues in varying amount during the swinging of the vessel, being zero when the vessel starts to swing and zero when it stops swinging, and maximum at the moment of greatest rate of swinging. Also, the torque exerted by the motor E on the rudder varies correspondingly to the said variations of pressure. Therefore, when the swinging of the vessel has been stopped by the motor E, the amount of its departure from its true course may be measured by the product of pressure and the time duration of the pressure, that is a pressure-duration integration, for the rheostat B.

The rotation of the armature 39 of the integrating motor D is caused by this unbalanced pressure of the rheostat B and continues so long as the unbalanced pressure obtains. By means of the travelling nut 37 and lever 34, the rotation of the armature 39 stores up or accumulates a corresponding unbalanced pressure in the piles of the rheostat F, so that when the swinging of the vessel has been stopped and the pressure in the rheostat B becomes balanced and the integrating motor D stops rotating, the rheostat F has been put into an unbalanced pressure condition, corresponding to the pressure-duration integration of the rheostat B.

Therefore, although the rheostat B ceases to maintain unbalanced fields in the motors D and E to respectively turn the one and give torque to the other, the rheostat F now supplies unbalanced currents to the windings of the motor E, due to its own unbalanced pressure condition and sets up in the motor E torque to move or hold the rudder in the direction to turn the vessel back toward its true course, and the vessel responds and starts a return swing.

The return swing of the vessel, by causing the axis 1 of the gyroscope A to swing, actuates the gyroscope to unbalance the pressure on the rheostat B in the opposite direction to that above described. This effects two results: first, it unbalances the fields of the motor D, rotating it in the direction opposite to the former direction of rotation and, by means of the travelling nut 37, moves the lever 34 in the direction to remove the unbalanced pressure of the rheostat F, and hence gradually diminishes the torque of the motor E due to the rheostat F; and second, it effects the energization of the fields of the motor E directly and in the direction to return the rudder back to the neutral position, or, if the energization is sufficiently great, to and beyond the neutral position.

The total sum of integration of the pressure-duration in the rheostat B, while the vessel is swinging back toward its path, will be the same as when it was swinging away from its path regardless of whether the movements are at the same or at different rates or extended over the same or different times so that correspondingly the number of rotations of the integrating motor armature 39 in one direction will be the same as that in the other direction; and by the time the vessel has been brought back to its prescribed course and the rheostat B is again under balanced pressure, the lever 34 will be in its mid-position, and the rheostat F will be in its balanced condition, and the fields of the motors D and E will become neutralized and the rudder will take up its neutral or straight ahead position.

Although I have above, for the sake of clearness, referred to the gyroscope A as acting to stop departure of the vessel from the course and the integrating motor D as acting to return it to the course, it will be understood that these two actions occur concurrently. The result is that any attempt of the vessel to leave its course is met by a counteracting movement of the rudder to hold it on the course and prevent its leaving the course. This will be clear when it is observed that the torque of the motor E due to the rheostat B is augmented by torque due to the rheostat F.

Inasmuch however as the action to return it to the course cannot come into effect until it has actually left the course, the vessel will leave the course, but only by a very small amount, inasmuch as its actual tendency to leave the course sets up the action to return it.

The result of these concurrent actions is to hold the vessel far more closely to its prescribed course than has heretofore been possible. As shown hereinbefore, the action effective to hold the vessel to its course is not proportional simply to the amount of divergence from the course. To the contrary, the vessel is stopped from swinging away from the course by action effective in proportion to the rate at which it tends to move away, thus confining its deviating movement to a very small amount. Furthermore, on the return swing of this slight amount back to the original course, the rate of the return movement itself is effective to reduce the returning action to prevent the vessel from swinging beyond its original course on the return; in fact, the rudder may even be thrown in the opposite direction to stop the returning movement as it approaches the original course.

A very brief résumé of the operation of the system as described in the foregoing would be that as the vessel starts to diverge from its true path, the resulting pressure on the rheostat B actuates the motor E and the rudder to stop the divergence. Concurrently, the integrating motor D actuates the rheostat F to throw the rudder still farther in the same direction. The divergence of the vessel is thus quickly stopped with the rudder in position to return it to the true course. The vessel then returns toward the true course due at first to the rheostat F alone and, as it returns, the rheostat B actuates the integrating motor to remove the effect of the rheostat F diminishing its effect on the motor E and also directly effecting the motor E to return the rudder to its neutral position which position is reached when the vessel reaches the true course.

The maximum swing from the true course in the first instance is thus very small and hence the tendency to swing beyond the true course on the return swing is very small, and any slight over-travel or over-swing is furthermore immediately met by corrective action of the rudder. If the return toward the true course in the first instance is violent predicating an overswing the rheostat B will effect a corrective throw of the rudder beyond neutral position during the return and bring it to neutral coincident with the return to the course.

The foregoing description applies to a single disturbance of the vessel in one direction by which it is moved from its path. But, the algebraic accumulating action of the integrating motor will act in cases of compound disturbance, however complicated, to return the vessel to its path in concurrent cooperation with the gyroscope to stop its divergence and thus maintain the vessel substantially on a true path.

Thus the primary function of the automatic steering apparatus is to turn the rudder into the position to check the swing of the vessel away from the course which at any moment it is following; and, after the swing has thus been stopped, to position the rudder to return the vessel toward said course; and apply power to the rudder commensurate with the rate of the diverging swing, to effect an immediate checking of the swing, and to control the position of the rudder and application of power thereto on the return swing commensurate with the rate of the return swing, to check and stop the return swing at or before the return of the vessel to the said momentary course. The automatic apparatus functions to prevent the vessel, upon its return swing, from swinging beyond its said momentary or approximate course, and in this respect differs fundamentally from all prior automatic steering systems. In no prior automatic steering systems so far as I am aware, can the momentum acquired by the vessel during its return swing be completely counteracted or absorbed by the rudder positions by the time the vessel returns to the course; and consequently in prior systems, the vessel swings beyond the course, is then stopped and returned and again swings beyond the course in the opposite direction and so on, resulting in a continuous swinging back and forth from one side to the other of the course, effecting what I have termed a "hunting" movement.

With the automatic apparatus and system of my invention, however, the momentum of the vessel on its return swing is completely absorbed by the time it has returned to the course and there is no overswing. In order to insure that it will not overswing the course, I may even overcompensate for the momentum (as will be understood from the detail description of the functioning of the apparatus described hereinbefore) so that the return swing is stopped slightly before the vessel actually reaches the exact course.

The apparatus of my invention is readily and practically adjustable to effect stopping each return swing short of a prescribed course and thus to maintain the vessel approximately upon a set course and without the continuous swinging back and forth across the course as in the prior art. And theoretically it is susceptible of adjustment to effect stopping the return swing exactly on the prescribed course. However, I am aware that to automatically maintain the vessel on its course to a high degree of accuracy would require substantially absolute perfection in the parts of the mechanism, substantially frictionless bearings, substantially perfect efficiency of power translation from one element of the apparatus to another, and that such a necessary high degree of perfection is not only difficult and costly of attainment but is undesirable in apparatus of this class. In the preferred practice of my invention therefore, I construct the apparatus hereinbefore described to a reasonable degree of accuracy and supplement its operation by apparatus now to be described. That part of the embodiment of my invention hereinbefore described therefore will respond sensitively to any tendency of the vessel to leave the course and will quickly apply the necessary power to check and stop the swing of the vessel, and then similarly will return the vessel to or almost to the prescribed course, checking the return swing of the vessel to destroy all momentum which would carry it beyond the line of the course. Any error in the vessel's course, whether momentary or accumulative, is observable from time to time by the pilot of the vessel and means is placed at his disposal whereby he may from time to time correct the error.

This compensation is effected in connection with the windings 45, 46 and 47, 28 on the integrating motor field. These windings are adapted to be energized from the battery C through a rheostat G. A wire 74 conducts current to a movable arm 75 of the rheostat and thence current may flow in two directions through the two parts of the resistance on each side of the contact arm and thence by way of wires 76 and 77 to the two pairs of windings in parallel and onto the battery by wire 78. The windings 45 and 46 oppose each other as do the windings 47 and 48.

When the arm 75 is in the middle position, the windings are equally energized and neutralize each other but when the arm 75 has moved to one side or the other of the center, one of the windings will overpower the other and produce a resultant magneto-motive force in the field. The resultant effect of these windings is very small as compared with that of the windings hereinbefore described, but is sufficient to unbalance the action of the integrating motor. Therefore, if the pilot observes that the craft is slightly off the course, he may adjust the rheostat G by the arm 75. This will cause the integrating motor to rotate slightly and put a slight pressure on the rheostat F in one direction to give unbalanced current to the motor E and cause it to exert a corresponding torque on the rudder in the corresponding direction to correct the error or departure of the vessel from the course.

Thus the main or gross operation of steering the vessel may be performed automatically by the automatic apparatus hereinbefore described and the final result refined to as great degree of accuracy as may be desired by the manual control of the rheostat G, and the automatic checking and absorbing of the swings of the vessel from its course is effected far more sensitively and commensurately and quickly than is possible even by the most experienced seaman or steersman and the vessel proceeds therefore upon a more nearly straight line course than is possible either by hand-steering or by prior art steering apparatus.

Movement of the arm 75 of the rheostat G, has the effect of changing the neutral or balanced position of the vessel's rudder.

Again, the vessel may be caused at will to follow a curved path by the same means. In this case, the rheostat arm 75 would be moved far enough to unbalance the rheostat F sufficiently to throw the rudder over to a point where it would turn the direction of the vessel. As the vessel then starts to turn, the gyroscope would act upon the rheostat B in the direction to oppose the effect of the rheostat F, and, in the field of the integrating motor, to balance the effect of the current from the rheostat 73. The integrating motor would then stop turning and thereafter control the rudder to maintain the vessel at a constant rate of turning.

During the resulting movement of the vessel on the curved path, the gyroscope A exerts continual pressure on the rheostat B; and any departure of the vessel from a prescribed curvilinear path will change the pressure exerted by the gyroscope to effect regulation of the rudder and thus the vessel will not only follow a curved path but follow it accurately and without material variation therefrom. Incidentally, such curvilinear steering of a vessel is of very great importance in the case of air craft, inasmuch as turns are one of the maneuvers in which there is the most danger.

Also, if the vessel responds to a continuous cross wind or to a variation in the driving force of one of several propellers, or to any other like influence, so that the vessel tends of its own accord to follow a curved path, the mechanism above described may be operated to continuously correct these variables and steer the vessel on a straight course. To accomplish this, the rheostat arm 75 may be moved in the direction which would normally tend to steer the vessel on a curved path curving in a direction opposite to the curve which the vessel is tending to follow.

Again, to change the course of the vessel from one straight direction to another straight direction, is to cause it to follow a curvilinear path for a brief period in going from one course to the other and this may be effected, as will now be understood, by the pilot, by suitable operation of the rheostat arm 75 during the curving part of the course.

It will now be self-evident that where a gyroscope compass is available on the vessel, it may be employed with suitable mechanical connections to operate the rheostat arm 75 so that the compass would automatically correct the errors or departures of the vessel from its exact course, and therefore the vessel would be maintained on an accurate course indefinitely. This arrangement has been illustrated diagrammatically in Fig. 5 where the rheostat arm 75 is indicated as mounted on a shaft 90 to which is connected a rotary power transmitting element 91 of the gyroscope compass.

As well understood by those skilled in this art, an element such as indicated at 91 will take up different rotated positions on each side of a neutral position in response to and commensurate with the divergence of the vessel from a set course; and the arm 75 will be moved thereby to corresponding positions on either side of the central position for the purpose described.

Again, instead of the gyroscope compass, an earth magnetic steel generator may be employed to electro-magnetically operate the arm 75. This arrangement is illustrated in Fig. 6 in which the arm 75 has polarized armatures 100 and 101 connected thereto and movable under the influence of windings 102 and 103 respectively, to rotate the arm 75 in alternate directions from a central position. The windings 102 and 103 may be connected to the commutator of a direct current generator, by wires 104 and 105, the armature 106 of which rotates in the earth magnetic field, the direction of which is generally indicated by line 107. As is well known, in such generators the axis of the armature may be adjusted to parallelism with the lines of force of the field, and in this position generates no current. In the instant case, this would be the adjusted position when the vessel was on its true course. Departure of the vessel from its course to one side or the other would present the armature 106 to the field in a position to generate current in one direction or the other, energizing the windings 102 and 103 alternatively as to polarity to actuate the plungers 100 and 101 in one direction or the other to correspondingly move the arm 75, which in turn would compensate the field windings 45, 46 and 47 and 48 as described in connection with Fig. 1 to cause the vessel to return to its true course as will be understood.

Again, the earth magnetic field generator may be employed to directly energize the integrator field winding. In this case, only one set of windings such as 45—47, and in series, would be employed (windings 46 and 48 being omitted) and connected to the generator of Fig. 6 in place of the windings 102 and 103. Upon change of course, current in the windings 45—47, in one direction or the other, would directly compensate the field of the integrator as described in connection with Fig. 1 to hold the vessel on its true course.

It is to be noted that by employing a gyroscope A of the precession type, all possibility of periodic movement thereof is avoided, inasmuch as the gyroscope has no direct swinging movement, but operates only to exert varying pressure. Likewise, the armature of the integrating motor being damped by the disk wheel 71 is likewise prevented from falling into periodically reversing movements; and also the motor E being damped by its connection with the rudder is aperiodic. Thus, the system as a whole is entirely free from mechanical resonance or periodicity, which is highly essential in controlling mechanisms for the purposes herein in view. This is highly important where great accuracy and fast and powerful operation of the rudder is required.

The following description relates more particularly to the individual elements of the apparatus which I may employ in connection with the above described system. It is desirable that the motors E shall be as free as possible from momentum or at least of such small momentum that in connection with the retarding or braking action of the rudder when being moved will not carry the rudder appreciably beyond the position determined by the various elements of the automatic mechanism.

The force or pressure exerted by the gyroscope A may be varied by varying the speed of its armature or rotor 60 and this in turn may be adjusted by adjusting the frequency of the alternating current supply 63 and a convenient method therefor is to adjustably change the speed of an alternator provided for the purpose.

The torque motor E may be operated as illustrated and described herein directly by current from the rheostats F and B, but as will occur to those skilled in the art, relay or booster devices, not shown, may be introduced in the path of the rheostat current to control motor current from another source where very large motors are desired to be used. The torque motor brushes and commutator may be variously designed as understood by those skilled in this art to suitably carry the necessary current without pitting or burning whether the rotor is at rest or rotating.

In the circuit of the armature of the integrating motor D, a rheostat 50 may be provided to adjust the armature current and by this means, the operation of the integrating motor may be adjusted to adapt it to different operating conditions which vary with size of the vessel with which the system is employed, etc.

The rheostats B and F may be of any known or suitable construction of the carbon pile type. It is desirable of course that the carbon pile be sensitive to small pressures and have a large maximum current capacity to permit the use of a relatively small gyroscope. Also to operate properly the pressure rheostats must be as positive in shutting down the current flow on the release of pressure as in increasing the current on increasing the pressures.

I therefore prefer to employ compression rheostats such as are shown and described in my pending application for Letters Patent Serial No. 223,002, filed by me September 30, 1927.

In the construction of the integrating motor, it will be evident to those skilled in the art that the iron of the magnetic circuit thereof must have low residual magnetism and the circuit must be so designed that the fields and armature will always be well below the magnetic saturation point even at maximum flux conditions.

Although I prefer to employ the pressure type of rheostat above described, it will be understood by those versed in this art that a rheostat of the sliding contact type may be employed especially in the case of rheostat F controlled by the integrating motor.

In the diagrammatic drawing, I have indicated that the rudder is directly connected to the motor E. It will be understood of course that if desired the torque applying connection of the motor and rudder may be made through gearing or any other desired and suitable mechanism.

My invention is not limited to the exact arrangement of the various organs thereof or the interconnections thereto nor to the particular type of apparatus diagrammatically indicated in each case. Various changes and modifications may be made therein as will be understood without departing from the spirit of my invention or sacrificing its advantages.

I claim:

1. In an electric control system for the steering rudder of a vessel, an electric power device comprising a movable element adapted to move in alternate directions, connections between the movable element and the rudder for moving the rudder in alternate steering directions, a pair of oppositely wound electro-magnetic windings for controlling the direction of movement of the movable element in response to the relative degree of energization of said windings, a rheostat of the pressure type in the circuit of each winding for controlling its energization, and means for varying the relative pressures of the rheostats in response to movements of the vessel with respect to its course, said pressure varying means comprising a precession gyroscope and a connection between the gimble frame of the gyroscope and the said rheostats.

2. In an electric control system for the rudder of a vessel, an electric motor, a rotor and stator for the motor, a rudder for the vessel, connections between the rudder and rotor, whereby torque developed in the rotor may be applied to the rudder, electro-magnetically opposing windings for the stator, a rheostat of the compression type in the circuit of each winding, means for varying the relative compression in the rheostats to vary the relative energization of the opposing windings to vary the torque of the motor from zero to a maximum in opposite directions, said compression varying means comprising a gyroscope provided with a rocking gimble frame and connections between the gimble frame and the compression rheostats.

3. In an electric control system for the rudder of a vessel, an electric motor, a rotor and stator for the motor, a rudder for the vessel, connections between the rudder and rotor, whereby torque developed in the rotor may be applied to the rudder, electro-magnetically opposing windings for the stator, a rheostat of the compression type in the circuit of each winding, means for varying the relative compression in the rheostats to vary the relative energization of the opposing windings to vary the torque of the motor from zero to a maximum in opposite directions, said compression varying means comprising a gyroscope provided with a rocking gimble frame and connections between the gimble frame and the compression rheostats, whereby the tendency of the gimble frame to rock is transmuted into rheostat compressing pressure.

4. In an electric control system for the rudder of a vessel, an electric motor, a rotor and stator for the motor, a rudder for the vessel, connections between the rudder and rotor, whereby torque developed in the rotor may be applied to the rudder, electro-magnetically opposing windings for the stator, a rheostat of the compression type in the circuit of each winding, means for varying the relative compression in the rheostats to vary the relative energization of the opposing windings to vary the torque of the motor from zero to a maximum in opposite directions, said compression varying means comprising a gyroscope provided with a rocking gimble frame and connections between the gimble frame and the compression rheostats, whereby the tendency of the gimble frame to rock is transmuted into rheostat compressing pressure to increase the pressure on one rheostat and decrease it correspondingly on the other.

5. In an electric control system, a pair of circuits to be controlled, a rheostat of the compression type in each circuit for varying the relative values of current in the circuits, means for operating the rheostats, said means comprising an electric motor, a motor rotor adapted to rotate in alternate directions, a pressure applying element for the rheostats, connections between the rotor and the element whereby rotation of the rotor in alternate directions may operate the element to increase the compression of one rheostat and diminish it on the other, and means for varying the polarity of the stator to control the direction of rotation of the rotor, and means for biasing the polarity of the stator.

6. In an electric control system for the steering rudder of a vessel, an electric power device comprising a movable element adapted to move in alternate directions, a rudder for the vessel, connections between the movable element and the rudder whereby force exerted by the movable element may be applied to the rudder to move it in alternate steering directions, a pair of oppositely wound electro-magnetic windings for controlling the alternate directions of movement of the movable element in accordance with the predominance of one winding over the other, means in the circuit of each winding for varying the current therein to effect the predominance of one over the other in response to movements of the vessel with respect to its course, a second electric power device comprising a second movable element adapted to move in alternate directions, a pair of oppositely wound electromagnetic windings for controlling the direction of movement of the second movable element in accordance with the predominance of one winding over the other and connected to the circuits of the first mentioned pair of windings to be energized proportionately thereto, a second means connected to the circuits of the first mentioned windings for coordinately varying the current therein in response to movements of the said second movable element.

7. In an electric control system for the steering rudder of a vessel, an electric motor, a rotor therefor adapted to turn in alternate directions, a rudder for the vessel, connections between the rotor and the rudder whereby torque of the rotor may be applied to the rudder to move it in alternate steering directions, a motor stator, a pair of oppositely wound electro-magnetic windings for the stator for controlling the direction of movement of the rotor in accordance with the predominance of one winding over the other, a rheostat device for varying the relative energizing current in the windings to effect the predominance of one over the other in response to movements of the vessel with respect to its course, a second motor, a rotor for the second motor adapted to rotate in alternate directions, a second motor stator, a pair of oppositely wound electro-magnetic windings for the second stator for controlling the direction of rotation of the second rotor in accordance with the predominance of one winding over the other and connected to the circuits of the first mentioned opposing windings to be energized proportionately thereto, a second rheostat device, connections between the second rheostat device and the first mentioned motor for varying the stator field thereof concurrently with the variations thereof due to the first mentioned rheostat device, means connected with the second rotor for operating the second rheostat device to increase or diminish the resistance thereof according to the direction of rotation of the second rotor and means connected with the first rheostat device for increasing and diminishing the resistance thereof in correspondence with movements of the vessel with respect to its course.

8. In an electric control system for the steering rudder of a vessel, an electric motor, a rotor therefor adapted to turn in alternate directions, a rudder for the vessel, connections between the rotor and the rudder whereby torque of the rotor may be applied to the rudder to move it in alternate steering directions, a motor stator, a pair of oppositely wound electromagnetic windings for the stator for controlling the direction of movement of the rotor in accordance with the predominance of one winding over the other, a pressure operable rheostat in the circuit of each winding for varying the relative energizing current in the windings to effect the predominance of one over the other, a second motor, a rotor for the second motor adapted to rotate in alternate directions, a second motor stator, a pair of oppositely wound electro-magnetic windings for the second stator for controlling the direction of rotation of the second rotor in accordance with the predominance of one winding over the other and connected to the circuits of the first mentioned opposing windings to be energized proportionately thereto, a rheostat device, connections between the rheostat device and the first mentioned pair of opposing windings for varying the energization thereof concurrently with the variations due to the said rheostats, means connected with the second rotor for operating the rheostat device to change the resistance thereof according to the direction of rotation of the second rotor and means connected with the said rheostats for increasing the resistance of one and decreasing that of the other and vice versa in correspondence with movements of the vessel with respect to its course.

9. In an electric control system for the steering rudder of a vessel, an electric motor, a rotor therefor adapted to turn in alternate directions, a rudder for the vessel, connections between the rotor and the rudder whereby torque of the rotor may be applied to the rudder to move it in alternate steering directions, a motor stator, a pair of oppositely wound electromagnetic windings for the stator for controlling the direction of movement of the rotor in accordance with the predominance of one winding over the other, a pressure operable rheostat in the circuit of each winding for varying the relative energizing current in the windings to effect the predominance of one over the other, a second motor, a rotor for the second motor adapted to rotate in alternate directions, a second motor stator, a pair of oppositely wound electro-magnetic windings for the second stator for controlling the direction of rotation of the second rotor in accordance with the predominance of one widing over the other and connected to the circuits of the first mentioned opposing windings to be energized proportionately thereto, a rheostat device, connections between the rheostat device and the first mentioned pair of opposing windings for varying the energization thereof concurrently with the variations due to the said rheostats, means connected with the second rotor for operating the rheostat device to change the resistance thereof according to the direction of rotation of the second rotor and means connected with the said rheostats for increasing the resistance of one and decreasing that of the other and vice versa in correspondence with movements of the vessel with respect to its course, said means comprising a precession gyroscope having a gimble frame operable on a gyroscope sensitive axis in a substantially horizontal plane and a pressure transmitting connection between the gimble frame and the said rheostats.

10. In an electric control system for the steering rudder of a vessel, an electric motor, a rotor therefor adapted to turn in alternate directions, a rudder for the vessel, connections between the rotor and the rudder whereby torque of the rotor may be applied to the rudder to move it in alternate steering directions, a motor stator, a pair of oppositely wound electro-magnetic windings for the stator for controlling the direction of movement of the rotor in accordance with the predominance of one winding over the other, a rheostat device for varying the relative energizing current in the windings to effect the predominance of one over the other, a second motor, a rotor for the second motor adapted to rotate in alternate directions, a second motor stator, a pair of oppositely wound electro-magnetic windings for the second stator for controlling the direction of rotation of the second rotor in accordance with predominance of one winding over the other and connected to the circuits of the first mentioned opposing windings to be energized proportionately thereto, a second rheostat device, connections between the second rheostat device and the first mentioned motor for varying the stator field thereof concurrently with the variations thereof due to the first mentioned rheostat device, means connected with the second rotor for operating the second rheostat device to increase or diminish the resistance thereof according to the direction of rotation of the second rotor and means connected with the first rheostat device for increasing and diminishing the resistance thereof in correspondence with movements of the vessel with respect to its course, and an auxiliary winding for the stator of the second motor for biasing the predominance of the magnetic energization thereof toward one direction of rotation of the rotor and means for adjustably varying the energization of the auxiliary winding to adjust the bias.

11. In an electric control system, an apparatus for controlling the steering rudder of a vessel, a rudder supported so as to be movable toward a neutral position from steering positions by the force thereon of fluid through which the vessel is propelled, an electric motor on the vessel having opposed field windings and a rotor adapted to be rotated in opposite directions and connected to the rudder for moving it to steering directions by the torque thereof and yieldably rotatable against the torque thereof by the force of the fluid on the rudder, whereby the rudder may be moved in the direction toward the neutral position when the fluid force on the rudder exceeds the yieldable torque of the motor and may be moved in the direction away from the neutral position when the torque applied thereto exceeds the yieldable force thereon, and whereby the rudder may take up steering positions at which the yieldable torque of the motor is balanced by the yieldable force of the fluid on the rudder, and means to effect a gradual stepless variation of current in the opposed motor windings respectively in response to movements of the vessel in respect to its course to cause the windings to vary the polarity and strength of the motor field to correspondingly vary the direction and torque of the rotor.

12. In an electric control system, an apparatus for controlling the steering rudder of a vessel, a rudder supported so as to be movable toward a neutral position from steering positions by the force thereon of fluid through which the vessel is propelled, an electric motor on the vessel having opposed field windings and a rotor adapted to be rotated in opposite directions and connected to the rudder for moving it to steering directions by the torque thereof and yieldably rotatable against the torque thereof by the force of the fluid on the rudder, whereby the rudder may be moved in the direction toward the neutral position when the fluid force on the rudder exceeds the yieldable torque of the motor and may be moved in the direction away from the neutral position when the torque applied thereto exceeds the yieldable force thereon, whereby the rudder may take up steering positions at which the yieldable torque of the motor is balanced by the yieldable force of the fluid on the rudder, and a rheostat in the circuit of each said windings operable by means responsive to changes of vessel direction to correspondingly increase the current in one winding and decrease it in another to cause the windings to vary the polarity strength of the motor field to correspondingly vary the direction of torque of the rotor.

13. In an electric apparatus for controlling the steering rudder of a vessel, a rudder supported so as to be movable toward a neutral position by the force thereon of fluid through which the vessel is propelled, a motor on the vessel, a rotary element of the motor movable in two directions and connected to the rudder for moving it in two steering directions, and rotatably yieldable against the force supplied by the motor under the force of the fluid on the rudder, whereby the rudder may move in the direction toward the neutral position when the fluid force on the rudder exceeds the torque applied thereto by the motor, and may be moved in the direction away from the neutral position when the torque of the motor supplied thereto exceeds the yieldable fluid force thereon, and whereby the rudder may take up steering positions at which the yieldable torque is balanced by the yieldable force of the fluid on the rudder, and automatic means responsive to diverging movements of the vessel from a preselected course to vary the torque applied by the motor to the rudder commensurable with the amount of divergence and with the rate at which it occurs.

OTTO W. GREENE.